United States Patent
Barolo et al.

(10) Patent No.: US 10,611,658 B2
(45) Date of Patent: Apr. 7, 2020

(54) INVERTER UNIT FOR A GLASSWARE FORMING MACHINE

(71) Applicant: BOTTERO S.p.A., Cuneo (IT)

(72) Inventors: Maurizio Barolo, Fossano (IT); Zdenko Kuz, Steinhausen (CH)

(73) Assignee: BOTTERO S.P.A., Cuneo (IT)

( * ) Notice: Subject to any disclaimer, the term of this patent is extended or adjusted under 35 U.S.C. 154(b) by 186 days.

(21) Appl. No.: 15/933,483

(22) Filed: Mar. 23, 2018

(65) Prior Publication Data

US 2018/0273417 A1    Sep. 27, 2018

(30) Foreign Application Priority Data

Mar. 23, 2017   (IT) .................. 102017000032224

(51) Int. Cl.
   *C03B 9/16*    (2006.01)
   *C03B 9/40*    (2006.01)
   *C03B 9/193*   (2006.01)

(52) U.S. Cl.
   CPC ............ *C03B 9/165* (2013.01); *C03B 9/1932* (2013.01); *C03B 9/40* (2013.01)

(58) Field of Classification Search
   CPC ......... C03B 9/165; C03B 9/1932; C03B 9/40; C03B 9/16
   See application file for complete search history.

(56) References Cited

U.S. PATENT DOCUMENTS

| | | | |
|---|---|---|---|
| 2,834,155 A | 5/1958 | Allen | |
| 3,233,999 A | 2/1966 | Mumford | |
| 4,295,873 A * | 10/1981 | Trutner | C03B 9/34 65/102 |
| 4,652,291 A * | 3/1987 | Hirt | C03B 9/3537 65/167 |
| 5,846,282 A * | 12/1998 | Pinkerton | C03B 9/16 65/158 |

OTHER PUBLICATIONS

Italian Search Report dated Dec. 4, 2017 for Italian application No. 201700032224.

* cited by examiner

*Primary Examiner* — Queenie S Dehghan
(74) *Attorney, Agent, or Firm* — Ohlandt, Greeley, Ruggiero & Perle, LLP

(57) ABSTRACT

An inverter unit for a hollow glassware forming machine comprises a supporting structure; a first and a second pick-and-place arm having one or more recesses for picking up glassware and coupled to such supporting structure so as to rotate about a first axis and so as to translate along such first axis between an open position and a closed position; and a centering device having a head, which can rotate about a second axis. The centering device also has a transmission mechanism, which converts the rotary motion of the head into a translational motion of the supporting structure along the first axis with respect to a fixed base.

10 Claims, 4 Drawing Sheets

INVERTER UNIT FOR A GLASSWARE FORMING MACHINE

CROSS REFERENCE TO RELATED APPLICATIONS

This application claims benefit under 35 U.S.C. § 119(a) from Italian Patent Application No. 102017000032224 filed on Mar. 23, 2017, the entire contents of which are incorporated herein by reference.

TECHNICAL FIELD

The present invention relates to an inverter unit for a hollow glassware forming machine.

BACKGROUND OF THE INVENTION

A known typology of machines for forming hollow glassware comprises a plurality of forming sections, each of which comprises, in turn, a blank mold, a finish mold and an inverter unit arranged between the blank mold and the finish mold. The inverter unit comprises a support adapted to be connected to a base of the machine and a gripping member, which is adapted to grip the semi-finished glassware, realized in the blank mold, and rotating approximately 180° about a horizontal axis for transferring the semi-finished glassware into the finish mold, where a blowing step will be carried out.

In particular, the gripping member comprises a pair of arms, movable in a direction parallel to the horizontal rotation axis between a closed position, for gripping one or more semi-finished products realized in the blank mold and holding such semi-finished products during the rotation about the horizontal axis, and an open position for releasing the semi-finished products into the finish mold.

The arms comprise respective elongated bodies, in particular of the plate-type, having recesses for gripping the semi-finished glassware, and respective end sleeves, from which the elongated bodies protrude. The sleeves are operated by means of special actuators for performing the rotation about the horizontal axis and for the translation, which opens and closes the arms. At the same time, the elongated bodies are coupled to the respective sleeves by means of guide and slide couplings, which allow the position of the elongated bodies to be adjusted in a tangential direction with respect to the horizontal rotation axis, and by means of tightening screws, which hold the chosen position with respect to the sleeves.

The need is felt to adjust the axial position of the arms in an accurate manner on initial assembly of the machine, so as to align such axial position, in a precise manner, with the blank and finish molds. The same axial adjustment can also be useful in cases where production defects related to a misalignment of the arms with respect to the molds are identified. In the current known solutions, no mechanism is included for performing a centering in an axial direction of this type.

In particular, the need is felt to perform such centering in an axial direction in a simple, accurate and quick manner.

SUMMARY OF THE INVENTION

It is an object of the present invention to realize an inverter unit capable of satisfying the above needs.

The object of the present invention is achieved by an inverter unit according to claim 1.

BRIEF DESCRIPTION OF THE DRAWINGS

For a better understanding of the present invention, the latter will be described based on a preferred embodiment shown in the appended figures, wherein.

DETAILED DESCRIPTION OF THE INVENTION

Figure 1:
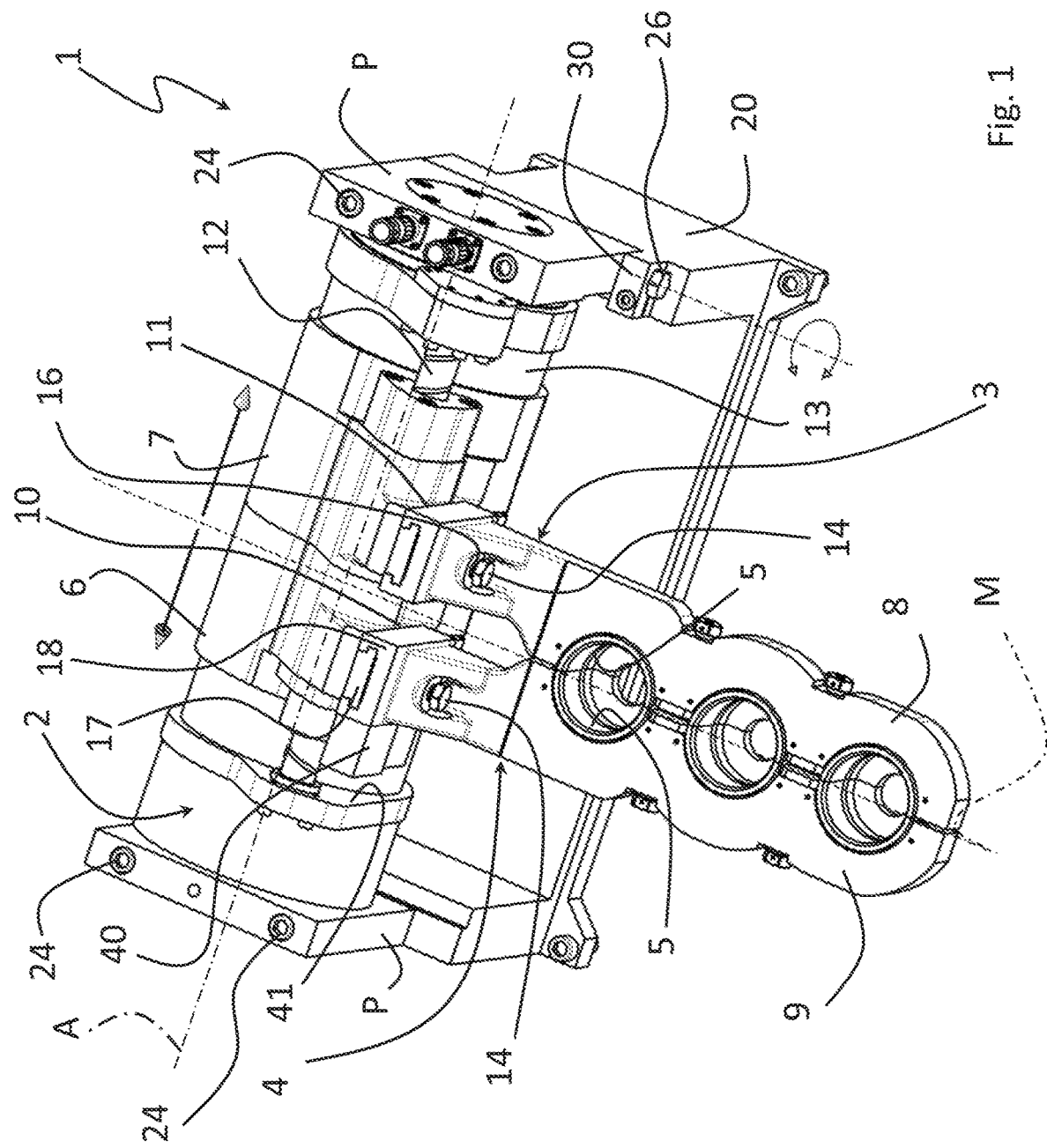
FIG. 1 is a perspective view of an inverter unit according to the present invention.

FIG. 1 globally shows an inverter unit 1 arranged between a station provided with a blank mold and a station provided with a finish mold (both not shown) for realizing hollow glassware. In particular, both stations and the unit 1 constitute part of a forming section of an I.S. machine.

The unit 1 comprises a rigid structure 2, suitable for being brought from a frame or a base of the machine, and jointly movable pick-and-place arms 3, 4, for rotating about an axis A, with an angular excursion of approximately 180° and for translating in opposite directions to each other, along the axis A between an open position and a closed position.

According to known methods, not described in detail, the arms 3, 4 are actuated for translating along the axis A in a coordinated manner and for rotating together about the axis A.

In particular, the motors or actuators for opening and closing the arms 3, 4 are independent of the motors or actuators, which allow the arms 3, 4 to rotate about the axis A. In the open position, shown in FIG. 2, the arms 3, 4 are ready for gripping or unloading semi-finished hollow glassware. In the closed position, shown in FIG. 1, the arms 3, 4 grip the semi-finished hollow glassware and hold it during the rotation from the blank mold to the finish mold. Preferably, in order to hold the semi-finished hollow glassware during the 180° inversion, each arm 3, 4 has one or more recesses 5, horizontally facing the recesses 5 of the other arm 3, 4, so as to define one or more seats where a portion of the semi-finished hollow glassware is tightened during closing. In the specific embodiment shown in the figures, the arms 3, 4 define three seats for respective semi-finished hollow glassware. In particular, each seat is defined by a respective collar, formed by combining two substantially semi-cylindrical shaped pieces, each associated with a respective recess 5.

The arms 3, 4 comprise respective connection bodies defined in particular by sleeves 6, 7 and mounted onto the structure 2; and respective elongated bodies 8, 9, which comprise respective gripping portions, in detail, plate-shaped, defining the recesses 5, and they are each coupled to the corresponding sleeve 6, 7 by means of a guide and slide assembly 10, 11.

The sleeves 6, 7 are movable along the axis A with the action of an actuator device, so that the arms 3, 4 adopt the open and closed positions. For example, both of the sleeves 6, 7 engage with a single motorized recirculating ball screw 12. Such screw presents a plurality of profiles for the arm 3 and a plurality of profiles for the arm 4, so that the rotation of the screw in one rotation direction brings the arms 3, 4 into the open position, and the rotation of the screw in the other direction brings the arms 3, 4 into the closed position.

The sleeves 6,7 are guided to translate along the axis A, in particular by a tubular cross member 13 belonging to the structure 2, and inside which a rotary engine is arranged, in a known manner, for rotating the arms 3, 4 about the axis A.

According to a preferred aspect of the present invention, the structure 2 comprises a pair of plates P orthogonal to the axis A, fixed to each other and arranged, in particular, on opposite longitudinal sides of the tubular cross member 13. Preferably, the plates P also carry the motorized recirculating ball screw 12.

In order to adjust the position of the elongated bodies 8, 9 in a tangential direction, and adjust their reciprocal alignment to make the recesses 5 match in the closed position, each assembly 10, 11 comprises a guide element 17, defined by an external portion of the sleeve 6, 7, and a slide 18 (FIG. 2) defined by a terminal portion of the elongated body 8, 9. In particular, the slide 18 is coupled to the guide element 17 by prismatic coupling, for example dovetail and runs along an adjustment direction tangential to the axis A. A tightening device 14, for example a screwing device, is comprised for fixing the slide 18 with respect to the guide element 17.

Figure 2:
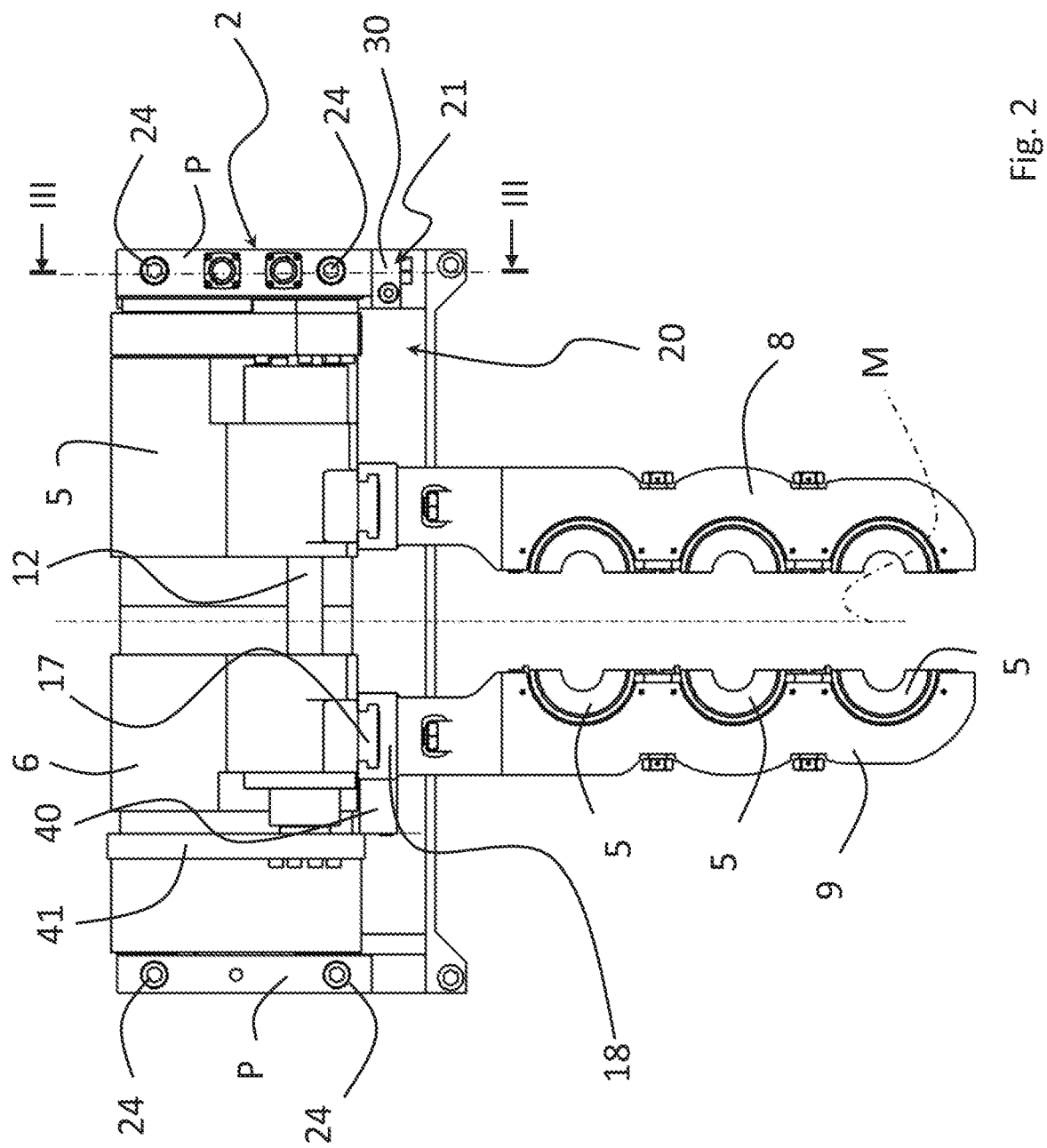
FIG. 2 is a plan view of the unit in FIG. 1.

When the arms 3, 4 are arranged in the closed position, they are set side by side along a midplane M, which is orthogonal to the axis A and whose outline is shown in FIG. 2.

The position of the midplane M is adjustable along the axis A by means of an axial translation of the structure 2 with respect to a base 20 belonging to the unit 1. In particular, the base 1 has a horizontal flat upper surface on which the plates P are resting and they are sliding in a parallel direction to the axis A. The inverter unit 1 further comprises a centering device 21, which operates between the base 20 and the structure 2. In turn, the base 20 is fixed, not shown, to a frame or a base of the machine.

Figure 3:
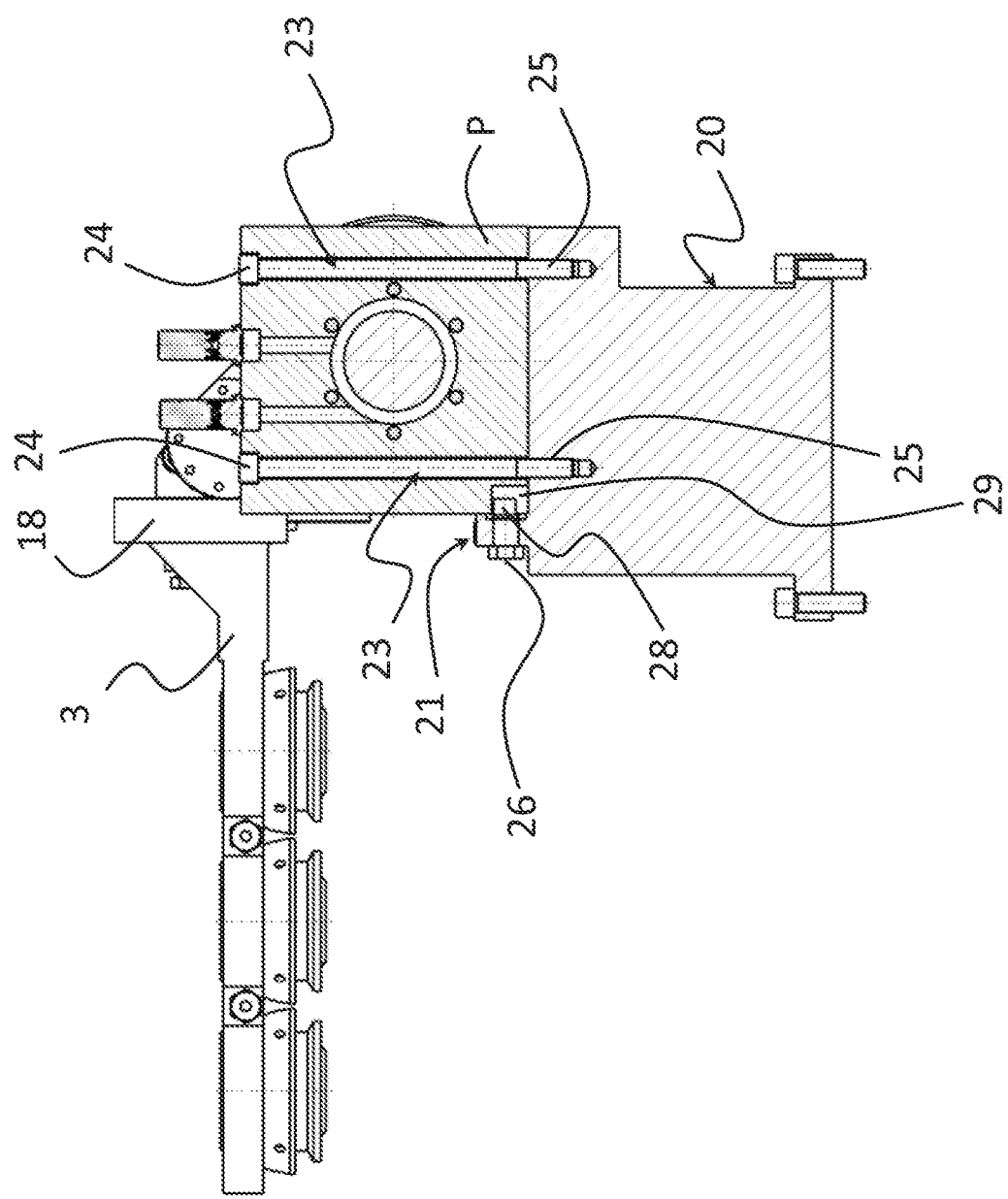
FIG. 3 is a section according to the plane having an outline III-III in FIG. 2.

The centering device 21 adjusts the position of the midplane M along the axis A, moving the plates P with respect to the base 20, in response to an action by an operator using equipment or instruments. After the adjustment, the plates P are blocked with respect to the base 20 by means of an opportune connection system, for example by means of a system of threaded tie-rods. In particular, the connection system comprises tie-rods or screws 23 (FIG. 3), each having a head 24 engaging a corresponding plate P and a threaded portion 25 screwed into the base 20. In particular, the axes of the screws 23 are orthogonal to the axis A and to the upper surface of the base 20.

According to a preferred aspect of the invention, each screw 23 has a leg, which engages a relative passage of the plates P with play. Such passage has a dimension greater than the leg of the screw 23 in a direction parallel to the axis A, for example, it has a buttonhole-shaped cross-section, to allow the plates P to slide with respect to the screws 23 when the tightening of the threaded portions 25 in the base 20 is loosened. At the same time, the legs of the screws 23 can provide a certain guiding action for the sliding of the plates A.

The centering device 21 comprises: a head 26 arranged externally to the structure 2 and the base 20, so as to be able to be operated by an operator using equipment or tools; a pin 27 which is connected to the head 26 and can rotate with the head 26 about its own axis B; and a transmission mechanism for converting the rotary motion of the pin 27 into a translation of the structure 2 in a direction parallel to the axis A.

According to the preferred embodiment of the present invention, the transmission mechanism, which converts the rotary motion into a translational motion, is of a cam type, in other words it comprises a cam 28, which is fixed with respect to the pin 27. The cam 28 has a C axis parallel and spaced apart from the axis B. As shown in the figures, the axis B is orthogonal with respect to the axis A.

The cam 28 engages a seat 29, delimited by lateral surfaces, which are orthogonal to the axis A, spaced apart from each other and parallel to the axes B and C; the cam 28 is in contact with such lateral surfaces, so as to push the one or the other of such surfaces in a parallel direction to the axis A when it is rotated about the axis B. Naturally, the maximum translation stroke is defined by the double of the distance between the axes C and B.

Figure 4:
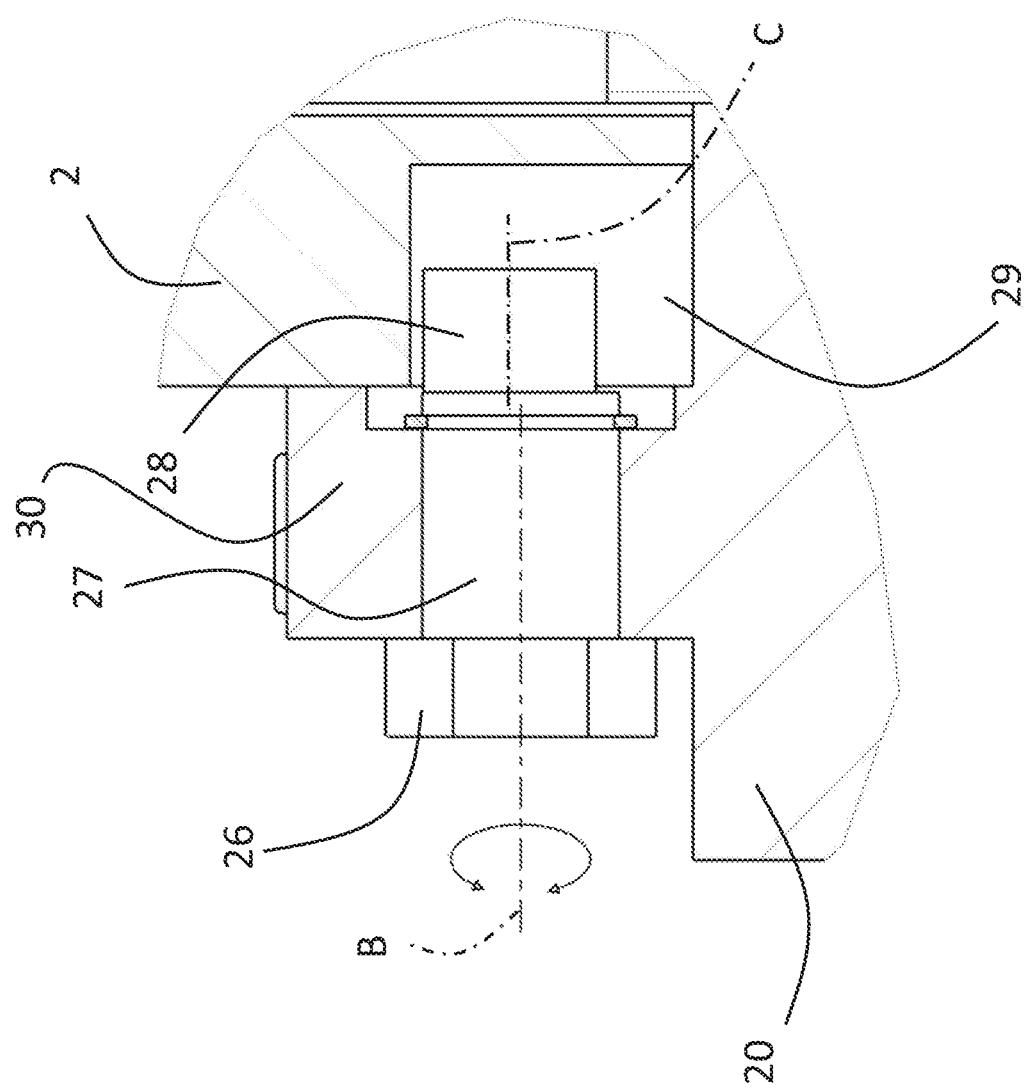
FIG. 4 is an enlargement of a detail in FIG. 3.

As shown in FIG. 4, the head 26, for example, which is hexagonal, and the cam 28 are supported by the base 20, while the seat 29 is defined by the structure 2, in particular by one of the two plates P. Preferably, the pin 27 can idly rotate inside a hole realized in an elevation 30 of the base 20, which protrudes upwards in a position facing a frontal surface of the aforesaid plate P. The seat 29 has an opening in correspondence with such frontal surface; for protection from residue, dust or other solid contaminants, the elevation 30 has a breadth parallel to the axis A and a height such as to close the opening of the seat 29 for any relative position between the plate P and the base 20. In particular, the seat 29 is also open in correspondence with a lower flat surface of the plate P, which slides on the upper flat surface of the base 20. In this case, too, the base 20 has an extension, which is such as to close the seat 29 at the bottom in any relative position between the structure 2 and the base 20.

Furthermore, as can be seen in FIGS. 1 and 2, according to a preferred embodiment, the unit 1 comprises a dismountable spacer 40, coupled in a fixed position to one of the two arms 3, 4 for defining an end stroke position, in other words the operating condition of maximum opening of the arms 3, 4. In such operating condition, the spacer 40 is in contact with a stop 41, which is fixed with respect to the structure 2.

The advantages offered by the unit 1 according to the present invention are as follows.

The centering device 21 allows the position of the structure 2 and the arms 3, 4 to be adjusted together, so as to align the closed position and the plane M described above with the molds. In particular, the adjustment is carried out in a meticulous and precise manner, thanks to the transmission mechanism, which transforms the rotary motion of the head 26 into a translational motion of the structure 2.

The cam 28 is simple and compact and it is further protected inside the seat 29 to increase its reliability.

The connection system defined by the screws 23 is independent of the cam device, so it tends not to influence the adjustment precision of the plane M. Furthermore, the adjustment and fixing functions are carried out effectively by components, which are easy to make and not very costly.

Finally, it is clear that modifications or variations can be made to the unit 1 described and illustrated herein without departing from the protective scope defined by the appended claims.

In particular, the screws 23 can be replaced by different connection systems for blocking the structure 2 to the base 20 after adjusting the centering. At most, the blocking function could be integrated into the device 21. To this end, for example, the centering device 21 could comprise an irreversible-type transmission mechanism, in transforming the rotary motion into translational motion.

Similarly, the cam mechanism 28 could be replaced by other mechanisms, for example by screw and nut screw or rack and pinion mechanisms.

The base 20 is shown in FIG. 1 as a U bracket, mounted, in turn, onto the structure of the forming machine. However, the base 20 may present other forms and be made up, for example, of the base of the forming machine.

The invention claimed is:

1. An inverter unit for a hollow glassware forming machine, the unit comprising:
   a supporting structure;
   a first and a second pick-and-place arm defining one or more recesses for picking up the glassware and coupled to said supporting structure, so as to rotate about a first axis, and so as to be movable along said first axis with respect to each other between an open position and a closed position;
   a centering device for adjusting the position of said supporting structure with respect to a base in a direction parallel to said first axis wherein said centering device comprises a head which can rotate about a second axis and external to said supporting structure so that it can be operated; and
   a transmission mechanism, which converts the rotary motion of the head into a translational motion of the structure.

2. The inverter unit according to claim 1, wherein said transmission mechanism comprises a cam rotationally driven by the head.

3. The inverter unit according to claim 2, wherein said cam is fixed with respect to said head and can rotate about a third axis, which is parallel to, and spaced apart from said second axis.

4. The inverter unit according to claim 2, wherein said cam is housed in a seat, which is provided in said supporting structure and is adapted to be closed by said base for any axial position of the structure.

5. The inverter unit according to claim 1, wherein said second axis extends orthogonal to said first axis.

6. The inverter unit according to claim 1, wherein said base forms part of said unit.

7. The inverter unit according to claim 6, wherein said base supports said head in a rotatable manner.

8. The inverter unit according to claim 6, wherein said supporting structure comprises:
   a tubular cross member, which extends along said first axis; and
   a pair of plates, which are arranged on opposite longitudinal sides of the tubular cross member and are supported by the base;
   wherein said transmission mechanism acts on one of said plates.

9. The inverter unit according to claim 1, further comprising a fixing device for blocking the supporting structure to the base.

10. The inverter unit according to claim 9, wherein said fixing device comprises a plurality of tie-rods, which extend in respective passages defined by said supporting structure and comprise respective threaded portions adapted to be screwed into said base in a direction parallel to said first axis, said passages having a dimension greater than the dimension of said tie-rods, so as to allow said supporting structure to slide with respect to the tie-rods when the tightening of the tie-rods is loosened.

* * * * *